United States Patent [19]
Brashears et al.

[11] Patent Number: 5,633,819
[45] Date of Patent: May 27, 1997

[54] INEXACT LEADING-ONE/LEADING-ZERO PREDICTION INTEGRATED WITH A FLOATING-POINT ADDER

[75] Inventors: Cheryl S. Brashears, Cupertino; James S. Blomgren, San Jose; Earl T. Cohen, Fremont, all of Calif.

[73] Assignee: Exponential Technology, Inc., San Jose, Calif.

[21] Appl. No.: 547,396

[22] Filed: Oct. 24, 1995

[51] Int. Cl.$^6$ .................................................. G06F 7/38
[52] U.S. Cl. ........................................ 364/748; 364/715.04
[58] Field of Search ................................ 364/748, 745, 364/715.04

[56] References Cited

U.S. PATENT DOCUMENTS

| | | | |
|---|---|---|---|
| 5,040,138 | 8/1991 | Maher, III | 364/748 |
| 5,144,570 | 9/1992 | Maher, III | 364/715.04 |
| 5,204,825 | 4/1993 | Ng | 364/715.04 |
| 5,241,490 | 8/1993 | Poon | 364/715.04 |
| 5,282,156 | 1/1994 | Miyoshi et al. | 364/748 |
| 5,317,527 | 5/1994 | Britton et al. | 364/715.04 |
| 5,341,319 | 8/1994 | Madden et al. | 364/748 |
| 5,343,413 | 8/1994 | Inoue | 364/748 |
| 5,392,228 | 2/1995 | Burgess et al. | 364/715.04 |
| 5,568,412 | 10/1996 | Han et al. | 364/748 |

*Primary Examiner*—Tan V. Mai
*Attorney, Agent, or Firm*—Stuart T. Auvinen

[57] ABSTRACT

The sum from a floating point adder is normalized by an initial shift based on a prediction for the position of the leading one or zero in the sum. This leading-one/zero prediction is based not on the operands input to the adder, nor the result from the adder, but on the intermediate generate and propagate signals within the adder. The adder has a first stage that reduces each bit-position to a generate and a propagate signal. The adder's second stage propagates the carries in the adder using these generate and propagate signals to generate the sum. Thus the adder's first-stage logic is also used for the leading one/zero prediction, reducing cost and complexity. An ECL half-adder cell is preferably used for the adder's first stage. A zero output is added to the ECL half-adder cell at minimal cost. The shift for the leading one/zero prediction is accomplished in two stages, with a selective complement of negative sums between the two-stage shift. This allows more time for a more exact prediction after the first coarse shift. The final exact detection of the leading one is pipelined to detect the sum after the complementor but before the second stage of the shifter. This allows the final exact detection of the leading one to occur in parallel with the second stage of the shifter, reducing the delay for generating the final normalized sum by a final shifter.

19 Claims, 9 Drawing Sheets

FIG. 1

PRIOR ART

FIG. 2

PRIOR ART

INEXACT LEADING-ONE/LEADING-ZERO PREDICTION INTEGRATED WITH A FLOATING-POINT ADDER

BACKGROUND OF THE INVENTION—FIELD OF THE INVENTION

This invention relates to floating point adders, and more particularly to leading-one prediction for post-normalization of a floating point sum.

BACKGROUND OF THE INVENTION—DESCRIPTION OF THE RELATED ART

Today's computers use floating point processors for tasks ranging from video rendering and scaling to spreadsheet calculation. The drive for faster performance has put the squeeze on all components of the computer, especially the floating point processor. Each portion of the floating point processor is scrutinized for ways to improve performance. Performance can sometimes be improved by using prediction of the outcome of floating point operations. Schemes abound for prediction of the leading one or zero in an un-normalized result, which prediction is needed to shift or normalize the result of some floating point operations. Yet these schemes may increase the cost and complexity of the processor.

Floating point numbers contain a fraction or mantissa portion and an exponent portion, and usually a sign bit. Often a shift operation is required to normalize a mantissa. A normalized floating point mantissa has a binary one as its most-significant-bit (MSB). The decimal point is implied to be immediately to the right of this MSB. However, after subtraction of two floating point numbers (or addition of opposite-signed numbers), the MSB may no longer be a binary one. The un-normalized result is scanned from the left to determine the location of the first or most-significant binary one, and then the un-normalized result is shifted left to place the first binary one in the MSB position of the normalized result.

Figure 1:
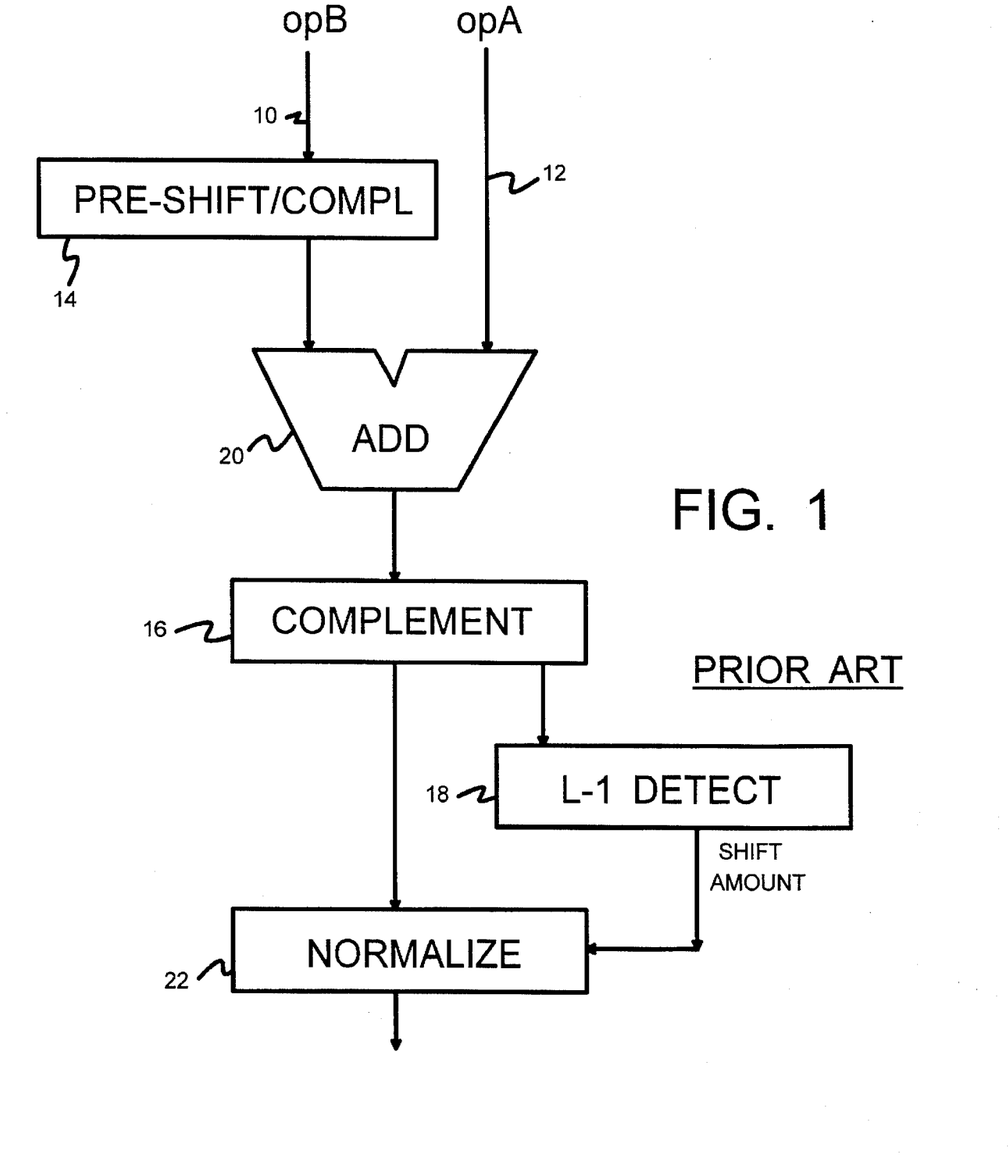
FIG. 1 is a diagram of a prior-art floating point processor without leading-one prediction.

FIG. 1 is a diagram of a prior-art floating point processor without leading-one prediction. Only the mantissa adder portion of the processor is shown; a mantissa multiplier and exponent adders are not shown. Two mantissas for operand A and operand B are input on busses 10, 12. Since the magnitudes of the two floating point inputs may not match, operand B is aligned to operand A by shifting its mantissa in preshifter 14. The exponent for operand B is also adjusted. Thus the two inputs to adder 20 have the same magnitude as indicated by their adjusted exponents.

Adder 20 produces the sum of operand A and possibly shifted operand B, which may be a negative number in two's complement format. Either operand A or operand B may be converted to two's complement (not shown) before being input on buses 10, 12 to perform a subtract operation, or if their sign bit is negative. A carry-in may also be asserted to perform subtraction if a one's complementor is used on the inputs. Complementor 16 selectively converts a negative result back to a positive number and sets the sign bit of the result. Leading-one detector 18 scans this positive result from complementor 16. Leading-one detector 18 scans the result from left-to-right, looking for the first, most-significant binary one. Leading-one detector 18 then outputs a shift amount to normalizer 22, which shifts the result by the amount determined by leading-one detector 18 to output a normalized result having a binary one in its MSB bit-position. The result exponent is then adjusted by this shift amount.

Leading One Prediction Allows Early Normalization Shift

Figure 2:
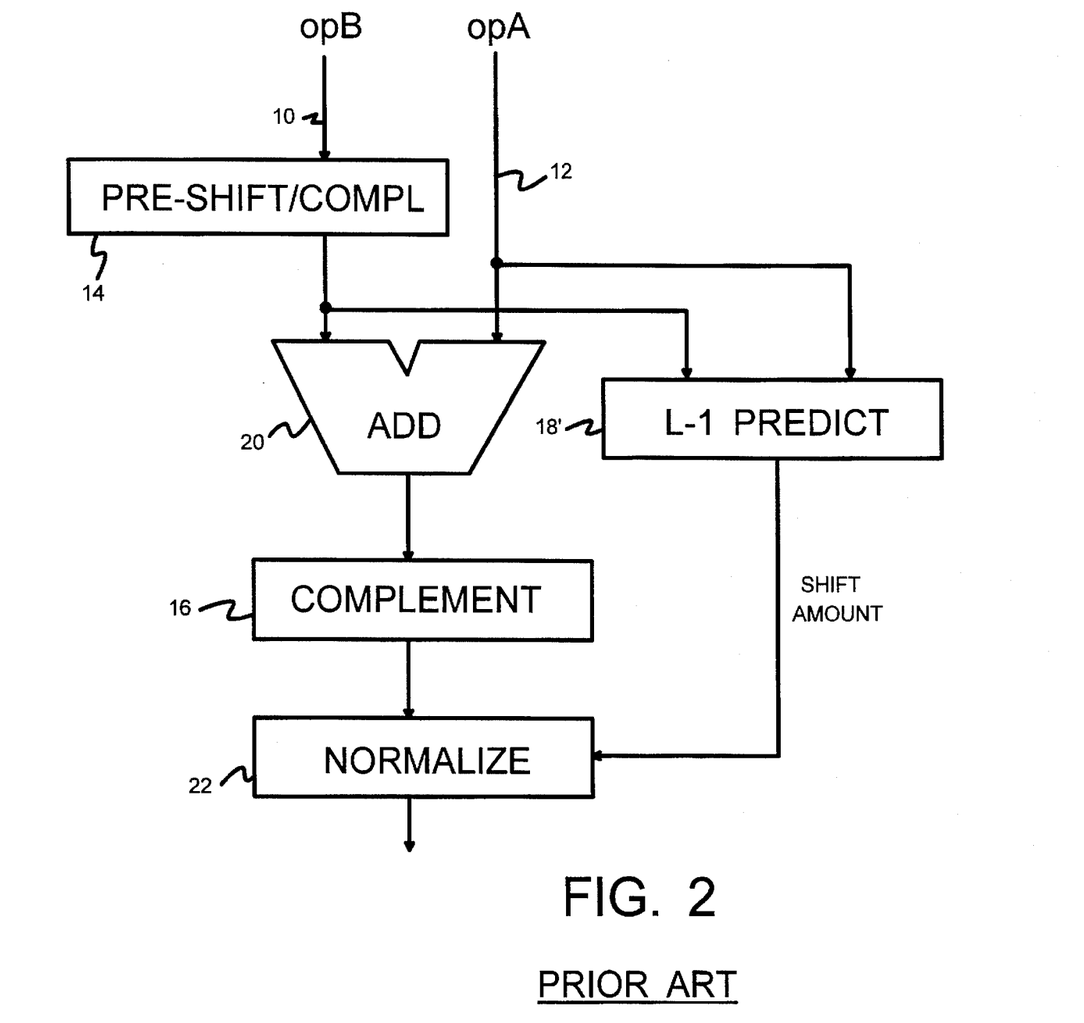
FIG. 2 shows a prior-art floating point processor with leading-one prediction.

FIG. 2 shows a prior-art floating point processor with leading-one prediction. While several components operate as described for FIG. 1, leading-one predictor 18' receives the operands input to adder 20 rather than the positive result after adder 20 and complementor 16. Since leading-one predictor 18' receives the operands input to adder 20, leading-one prediction can occur simultaneously with and in parallel to addition of the floating point mantissas in adder 20. Thus an extra delay (possibly an extra pipeline stage) for the leading-one detector 18 may be avoided.

Such a parallel leading-one predictor is disclosed by Britton et al. in U.S. Pat. No. 5,317,527. While Britton has advantages over his prior art, Britton's apparatus still suffers from additional cost and complexity of a separate leading-one detector/predictor.

What is desired is a leading one predictor that is less costly than a separate, discrete detector operating in series or parallel with the floating point adder. It is desired to share some of the existing adder logic with the leading-one prediction to reduce the size, cost and complexity of leading-one prediction. It is also desired to perform prediction on larger groups of bits to more efficiently predict the position of the leading one.

SUMMARY OF THE INVENTION

The sum from a floating point adder is normalized by an initial shift based on a prediction for the position of the leading one or zero in the sum. This leading-one/zero prediction is based not on the operands input to the adder, nor the result from the adder, but on the intermediate generate and propagate signals within the adder. The adder has a first stage that reduces each bit-position to a generate and a propagate signal. The adder's second stage propagates the carries in the adder using these generate and propagate signals to generate the sum. Thus the adder's first-stage logic is also used for the leading one/zero prediction, reducing cost and complexity.

A floating point adder generates a normalized sum of a plurality of input operands. The floating point adder has a plurality of half-adder cells, with each half-adder cell in the plurality of half-adder cells receiving a bit-position of each operand in the plurality of operands. Each half-adder cell outputs a generate signal when at least two of the plurality of operands have a binary one for the bit-position, while each half-adder cell outputs a propagate signal when at least one of the plurality of operands have a binary one for the bit-position.

A carry-propagator receives the generate and propagate signals from the plurality of half-adder cells, and outputs a sum of the plurality of operands. The carry-propagator includes means for propagating a carry input from adjacent lower-significance bit-positions to adjacent higher-significance bit-positions when the propagate signal is active, but not propagating the carry input when none of the generate and propagate signals input to the carry-propagate means is active. A leading significant-bit predictor receives the generate and propagate signals from the plurality of half-adder cells, and generates a first prediction signal indicating a predicted position of the most-significant bit in the sum.

A first shifter receives the sum from the carry-propagator. The sum is shifted and a shifted sum is outputted in response to the first prediction signal so that the most-significant bit in the sum is shifted to a more significant bit-position in the shifted sum. A leading significant-bit detector receives the shifted sum and determines the bit-position of a leading significant bit and outputs a final shift amount signal. A final shifter is responsive the final shift amount signal. The final shifter shifts the shifted sum such that the leading significant bit is shifted to a most significant bit-position in the normalized sum.

Thus the leading significant-bit predictor predicts the bit-position of the leading significant bit from the generate and propagate signals.

In further aspects of the invention the leading significant-bit predictor further includes a sequence means for detecting a sequence of the generate and propagate signals for a group of adjacent bit-positions. An output means outputs a found-one signal for the group of adjacent bit-positions when the sequence is not detected in the group of adjacent bit-positions, where the found-one signal indicates that at least one binary one is predicted to be present in the sum for the group of adjacent bit-positions. A prioritizer receives a plurality of the found-one signals for a plurality of groups of adjacent bit-positions, and it outputs the first prediction signal indicating the predicted position of the most-significant bit in the sum. The predicted position is a position for a most-significant group of adjacent bit-positions with the found-one signal. Thus the leading significant-bit predictor predicts the bit-position of a leading group contains a predicted binary one.

In still other aspects the sequence comprises any number of bit-positions with active propagate signals adjacent to a single bit-position with an activated generate signal adjacent to any number of bit-positions with neither the generate signal nor the propagate signal activated. The sequence produces a group of sum bits which are predicted to be absent any binary ones.

DETAILED DESCRIPTION

The present invention relates to an improvement in floating point adders. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

EXAMPLES OF FLOATING POINT ADDITION & SUBTRACTION

The following examples are provided to show the operations that occur in floating point addition and subtraction. The first example shows addition of two operands with different magnitudes. Pre-shifting and post-normalization are necessary.

|   | opA | $1.111101 \times 2^{15}$ |
|---|---|---|
| + | opB | $1.110011 \times 2^{12}$ |

First the mantissa of operand B is pre-shifted and its exponent adjusted:
pre-shifted opB $0.001110 \times 2^{15}$
Then addition is performed:

|   | opA | $1.111101 \times 2^{15}$ |
|---|---|---|
| + | opB | $0.001110 \times 2^{15}$ |
| sum |   | $10.001011 \times 2^{15}$ |

The sum is then right-shifted by one bit-position to yield the normalized result:
sum $1.000101 \times 2^{16}$ The second example shows subtraction of two numbers having the same magnitude. Pre-shifting is not needed, but post-normalization shifts the resulting mantissa many bit-positions.

|   | opA | $1.010101 \times 2^{15}$ |
|---|---|---|
| − | opB | $1.010111 \times 2^{15}$ |

Since operand B is negative and the adder actually only performs addition, the two's complement of opB's mantissa is generated:
2's Complement opB $0.101001 \times 2^{15}$
Then this 2's complement of opB is added to opA:

|   | opA | $1.010101 \times 2^{15}$ |
|---|---|---|
| + | opB | $0.101001 \times 2^{15}$ |
| sum |   | $1.111110 \times 2^{15}$ |

Since no carry-out occurs from the MSB of the adder, the result is a negative number. This result is complemented by taking its two's complement:
2's complement of sum $0.000010 \times 2^{15}$ The complemented sum must then be normalized. A leading-one detector signals that the first one is in the 5th decimal position, so a 5-bit left shift is needed:
normalized sum: $1.000000 \times 2^{10}$ Leading-one prediction schemes guess at the correct shift amount for normalization.

INTEGRATED LEADING-ONE PREDICTOR— OVERVIEW

Figure 3:
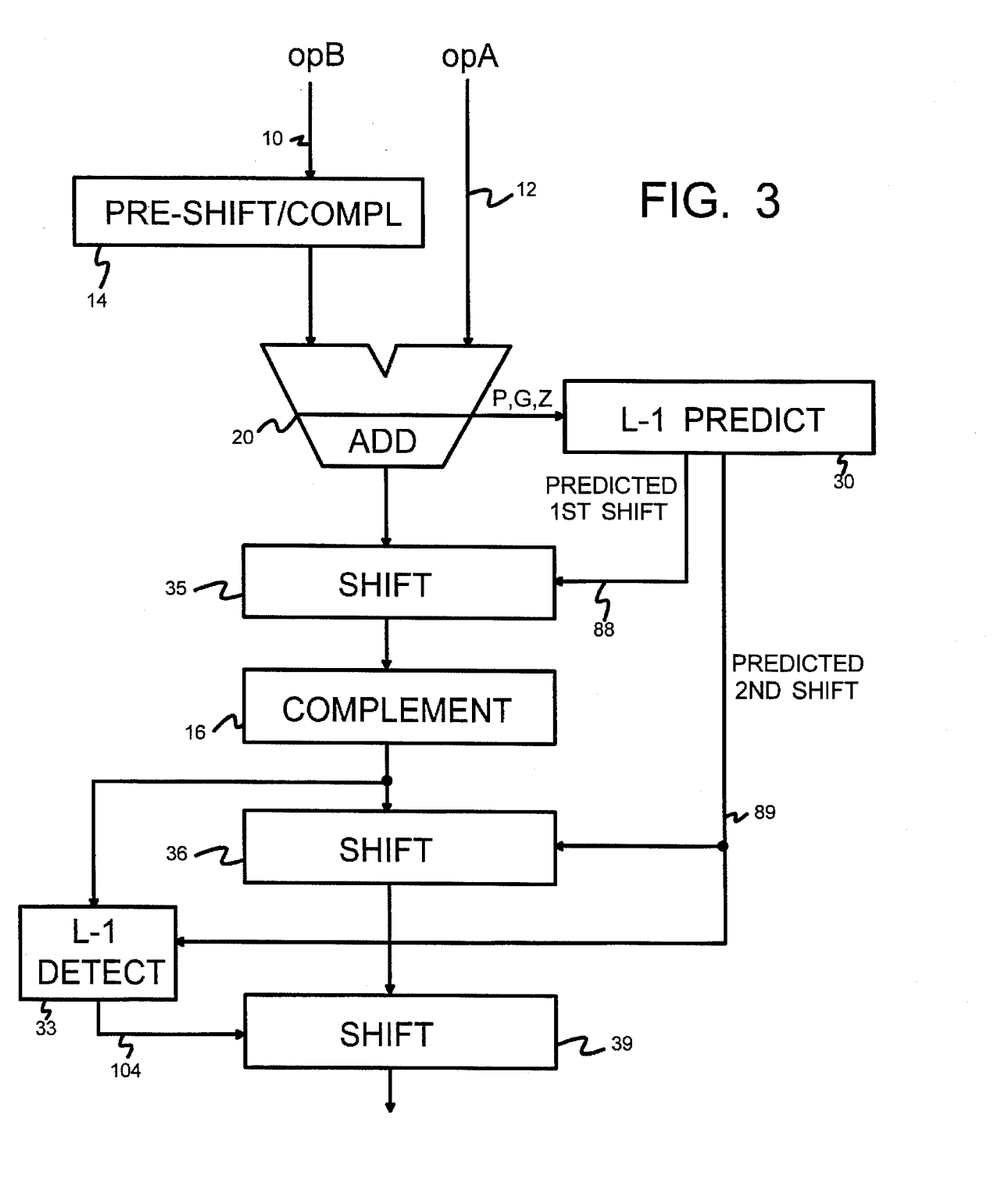
FIG. 3 shows a floating point processor with a leading-one predictor which receives intermediate propagate and generate terms from the adder.

FIG. 3 shows a floating point processor with a leading-one predictor which receives intermediate propagate and generate terms from the adder. In contrast to a prior-art leading-one predictor which received the operands input to adder 20, leading-one predictor 30 receives intermediate propagate, generate terms from the half-adder cells in adder 20 rather than the operands themselves. Thus the half-adder logic does not have to be duplicated in leading-one predictor 30 and adder 20.

Leading-one predictor 30 looks at groups of bits in adder 20 to predict the approximate location of the first one or first zero in the resulting sum. Although the predicted shift is somewhat inaccurate, it is quickly generated by leading-one predictor 30. This coarse prediction signal 88 controls the coarse shifting of the sum in coarse shifter 35. Complementor 16 then selectively complements the coarsely shifted sum when that sum is a negative number. The complemented positive sum from complementor 16 is then shifted a second time in second shifter 36, again under control of an intermediate prediction signal 89 by leading-one predictor 30. The complemented positive sum output from complementor 16 is input to partial leading-one detector 33, which accounts for the shift by second shifter 36 since the intermediate prediction signal 89 is also input to partial leading-one detector 33. Final shifter 39 receives final shift amount 104 from partial leading-one detector 33 and outputs the normalized sum.

DETAIL OF ADDER

A carry-save adder does not propagate the carries but merely outputs the intermediate carries. These intermediate carries and sums are then input to a 2-port full adder, which propagates internal carries and forms the final sum.

Figure 4:
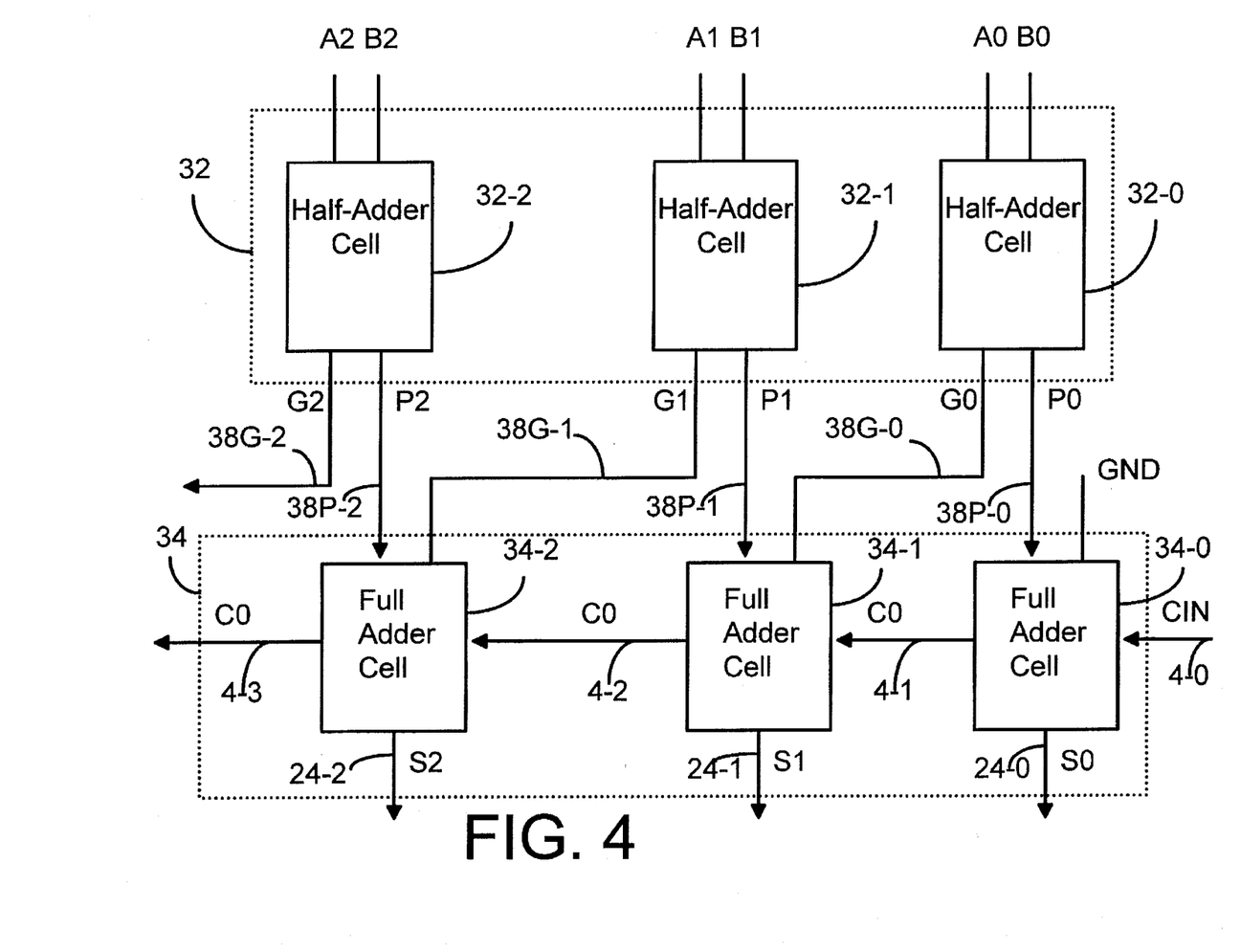
FIG. 4 illustrates one implementation of adder cells making up the adder of FIG. 3.

FIG. 4 illustrates one implementation of adder cells making up the adder 20 of FIG. 3. Carry-save or half-adder cells 32 comprises a plurality of half-adder cells 32-0, 32-1, 32-2 and other cells (not shown), one cell for each bit-position. Thus a 32-bit adder has 32 half-adder cells 32-0, 32-1 ... 32-31. Likewise full adder 34 comprises full-adder cells 34-0, 34-1, 34-2, and other full-adder cells (not shown), one cell for each bit-position. Thus 32 full-adder cells 34-0, 34-1 ... 34-31 are also required for a 32-bit adder. However, for simplicity and clarity FIG. 4 only shows the first 3 adder cells of all the adder cells in carry-save half-adder 32 and full-adder 34.

Each half-adder cell is connected in a similar fashion to carry-save adder cell 32-0, which has two inputs, A0, B0, which are the bit-position zero bits from input busses 10, 12, and produces two outputs, a propagate output 38P-0 and a generate output 38G-0. Each input and output to half-adder cell 32-0 is one-bit wide. The propagate output 38P-0 is calculated as the exclusive-OR of the inputs A0, B0 while the generate output 38G-0 is active high if both of the inputs A0, B0 are high. Half-adder cells 32-0, 32-2 may easily be extended to three or more inputs. The exclusive-OR's output is then active when an odd number of inputs are one.

Full-adder cells 34-0, 34-1, 34-2 are configured to propagate the carry terms 4-1, 4-2, 4-3 generated within full adder 34. Each full-adder cell is coupled to receive a propagate and a generate from the half-adder cells in carry-save half-adder 32, and each full-adder cell generates a single sum output 24-0, 24-1, 24-2. A third input to each full-adder cell is a carry chain signal 4-0, 4-1, 4-2 from the next least-significant full-adder cell. The second output from each cell is a carry chain output 4-1, 4-2, 4-3 to the next most-significant full-adder cell. Thus carries may be propagated all the way up the full adder. The adders of FIG. 4 are preferably implemented in BiCMOS or ECL gates, as a carry-save adder and a ripple-carry adder, but many other implementations of an adder are possible within the spirit of the invention. For example, several full-adder cells may be replaced by grouped logic which propagates the carry for a group at a time.

HALF-ADDER G, P, Z CELL

A half-adder cell generates a sum (propagate) and a carry (generate) term for one bit-position. Half-adder cells ignore carries from lower cells while full-adder cells propagate the carry. The sum output is active when either input is one and the other input is zero, which can be implemented as an exclusive-OR. The sum output is also known as propagate, since a carry into the cell is propagated as a carry output when the sum is one. If both inputs are one, then the sum is zero but the carry output is one. The carry output is also known as the generate, since a carry to the next-higher bit-position is generated. A G, P, Z cell is a modification of the G, P cell. Table 1 summarizes the propagate, generate, zero logic.

TABLE 1

| G,P,Z Half-Adder Cell | | | | |
|---|---|---|---|---|
| A | B | Sum (Propagate) | Carry-out (Generate) | Zero |
| 0 | 0 | 0 | 0 | 1 |
| 1 | 0 | 1 | 0 | 0 |
| 0 | 1 | 1 | 0 | 0 |
| 1 | 1 | 0 | 1 | 0 |

Figure 5:
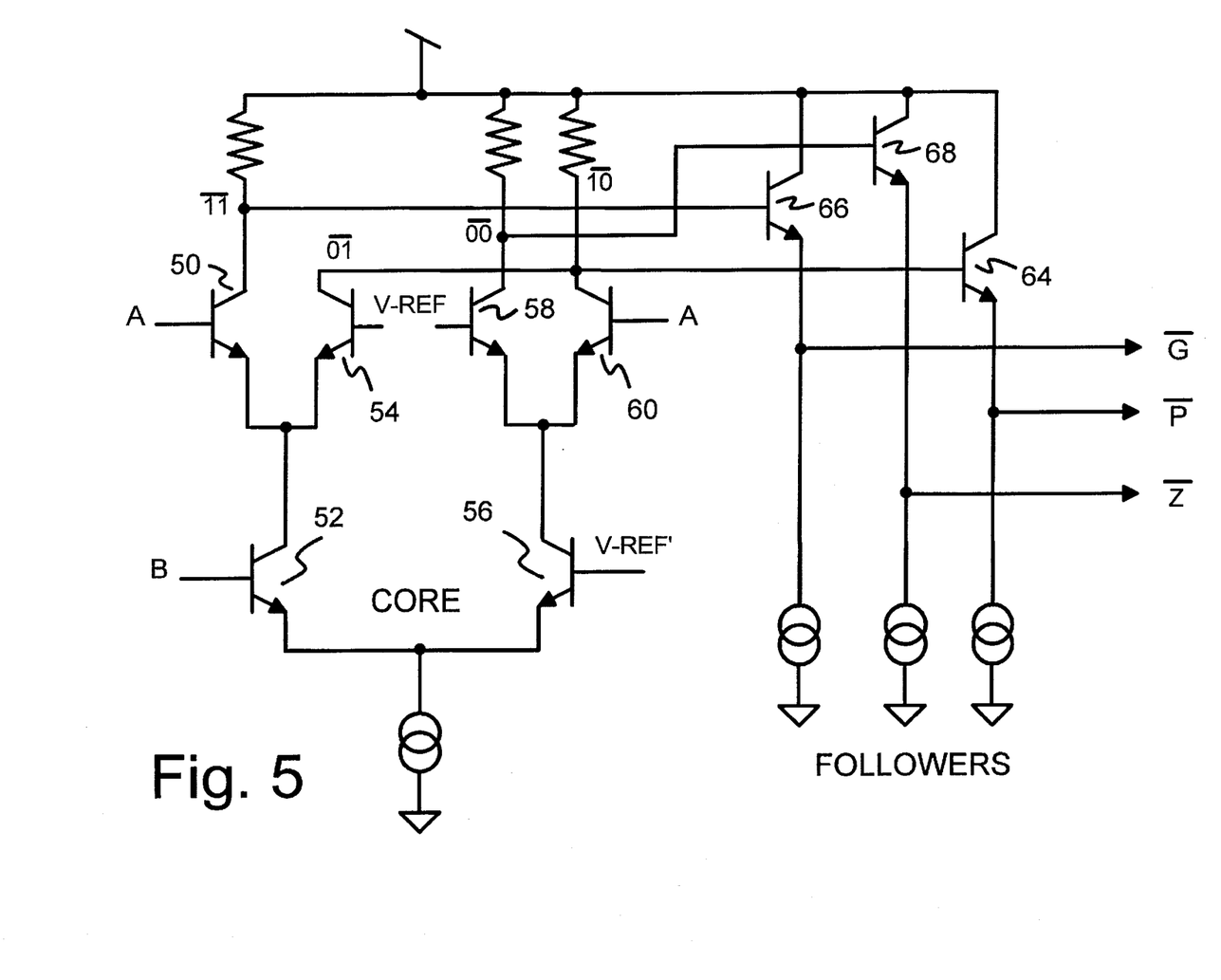
FIG. 5 is a schematic of an ECL half-adder cell outputting generate, propagate, and zero terms.

FIG. 5 is a schematic of an ECL half-adder cell outputting generate, propagate, and zero terms. Inputs A, B are both input to the adder at bit-position i from operands A and B. ECL switches currents in response to input voltages. When the voltage on input A to the base of transistor 50 is higher than the reference voltage applied to transistor 54, then current is switched through transistor 50. When the voltage on input B applied to transistor 52 is higher than the reference voltage applied to transistor 56, current is switched through transistor 52 rather than transistor 56. Likewise when input B is lower than the reference voltage on transistor 56, current is switched through transistor 60 when input A is a higher voltage than the reference voltage on transistor 58, but current is switched through transistor 58 when the voltage on input A is lower.

Thus current is switched through transistor 50 when AB=11, but transistor 54 when AB=01. Transistor 60 carries the current when AB=10, while transistor 58 is switching the current when AB=00. The collectors of transistor 50, 54, 58 are tapped off to the bases of follower-stage transistors 64, 66, 68 whose emitters produce inverted P, G, Z outputs.

The addition of the Z output to the ECL g,p half-adder cell requires the addition of just one follower stage, as the basic logic is already present in the gate. Current sources and resistors are implemented in a conventional manner.

LEADING ONE DETECTION

The first one is found by scanning from the most-significant bit on the left toward the right. When the sum has already been calculated, as for FIG. 1, the task is simple: the first one encountered is the leading one. If the number is not yet fully calculated, as for FIG. 2, then some form of prediction is used to approximately determine where the first one is located. This prediction may take the form of simply generating the sum in parallel.

Rather than examine each bit in isolation, adjacent bits may be examined together. Examining two or more bits together allows prediction even when the final sum has not yet been generated. For example, the leading one may be predicted before the carry is propagated through all the bit-positions. In that case leading-one prediction is based on the generate and propagate outputs from the half-adder cells.

2-Bit Detection Groups

The P, G, Z terms from the half-adder cell described for FIG. 5 can be used by the leading-one prediction logic. Even though the final sum is not known since the carry has not been propagated, the approximate location of the leading one or zero can be determined by examining adjacent bits. Table 2 shows all possible combinations of P, G, Z terms for two adjacent bits, and the possible final sum which depends on the carry into the adjacent bit. The dot to the left of the two sum bits in Table 2 indicates a carry-out from the group of two bits.

TABLE 2

| | Possible Combinations for 2 bit-positions | | | | |
|---|---|---|---|---|---|
| Bit Position i | Bit Position i-1 | Carry-in to bit i-1 is 0 | Carry-in to bit i-1 is 1 | Zero always present? | One always present? |
| Z | Z | 00 | 01 | YES | no |
| Z | P | 01 | 10 | YES | YES |
| Z | G | 10 | 11 | no | YES |
| P | Z | 10 | 11 | no | YES |
| P | P | 11 | .00 | no | no |
| P | G | .00 | .01 | YES | no |
| G | Z | .00 | .01 | YES | no |
| G | P | .01 | .10 | YES | YES |
| G | G | .10 | .11 | no | YES |

Table 2 shows that for some combinations it is possible to predict the presence of a one or a zero without knowing the carry into a bit-position. When the half-adder cells from both adjacent bits produce generate (G) terms, then the last row of table 2 shows that the final sum is 10 if the carry in is zero, or 11 if the carry in is one. Since a one is present in both 10 and 11, it can be predicted that a one is present near this bit position. However, since a zero is found in 10 but not 11, a leading zero cannot be predicted.

The last two columns of Table 2 show that a leading one is predicted when the halfadder cells for the adjacent bits output ZP, ZG, PZ, GP, or GG. A leading one is not predicted for the other combinations. Likewise the presence of a zero is predicted for the combinations ZZ, ZP, PG, GZ, GP.

Note that the prediction is inexact for the positions of the first or leading one or zero. For the GG case described above, the final sum is either 01 or 11. While it can be predicted that a one appears in this group of two bits, the exact position of the one is not determined. The leading one is the left bit when carry-in is one, but the leading one is the right bit when the carry-in is absent.

Larger Detection Groups Reduce Encoder Hardware

The concept of examining groups of bits can be extended to larger-sized groups. Larger groups can speed encoding logic since several bits are combined together and larger groups of bits must therefore be encoded. Larger groups require fewer inputs to a leading-one-detect priority encoder. Grouping by three bits requires only one-third the number of inputs to the priority encoder.

With larger groups, the intermediate carries between bit-positions in the group are essentially known for many cases. The group itself can force a zero or a one to appear, regardless of the carry in to the lowest-order bit of the group.

Resolving Groups of Bits

For an arbitrary binary string, certain combinations of P, G, Z terms cannot predict a leading one or zero. For example, a string of P terms is indeterminate. The final sum is all zeros or all ones, depending on the carry in. The string PPPP resolves to 1111 if the carry in is zero, but resolves to 0000 if the carry in is one.

Other strings are deterministic, but do not contain a one except from a carry in. The string ZZZZ does not contain any ones when the carry in is zero, and resolves to 0000. When the carry in is one the string ZZZZ resolves to 0001. Likewise the string GGGG resolves to 1110 with no carry in but to 1111 with a carry in. Thus the string ZZZZ cannot be used to predict a one, and the string GGGG cannot predict a zero.

Other combinations also are not deterministic. A single G term between a string of P's and a string of Z's is another example that cannot predict a one: PPPGZZZ. This string resolves to 0000000 when the carry in is zero, but to 0000001 when the carry in is one. The single G term generates an intermediate carry in to the string of P terms, which propagate the one out the left of the group without setting any sum bits.

A single Z term between a string of P's and a string of G's is an example that cannot predict a zero: PPPZGGG. This string resolves to 1111110 when the carry in is zero, but to 1111111 when the carry in is one. Thus a zero cannot be predicted for this string. The single Z term absorbs the intermediate carry from the G terms but does not generate an intermediate carry to the P terms. Thus no zero sum bit is generated by the single Z term sandwiched between the P and G terms.

Prediction for these strings can be generalized into two rules:

1) A one is predicted unless the string is all P's or all Z's or any number of P's followed by exactly one G and then any number of Z's. (PPP-G-ZZZ)
2) A zero is predicted unless the string is all P's or all Z's or any number of P's followed by exactly one Z and then any number of G's. (PPP-Z-GGG)

4-Bit Detection Groups

With four-bit strings or groups, a one is predicted unless any of the following groups occur:

PPPP
PPPG
PPGZ
PGZZ
GZZZ
ZZZZ

These groups are all possible combinations of G, P, Z terms meeting the requirements of rule 1. When rule 2 is followed, a zero is predicted unless one of the following groups is encountered:

PPPP
PPPZ
PPZG
PZGG
ZGGG

GGGG

These rules can easily be used for groups larger than four bits.

Logic that detects a one in a group of four bits is designed by receiving the P, G, Z terms from the four half-adder cells in the group, and detecting the six cases above. Logic terms are constructed for each of the six cases, and these are OR-ed together to produce a signal indicating that the P,G,Z inputs meet one of the six cases. By inverting this signal, a 'detected one' signal is generated for the group.

The groups are overlapped by one bit, so that a detect logic block is constructed for every three bit-positions. To detect both a one and a zero, two detect logic blocks are constructed for every three bit-positions: a detect one block and a detect zero block, implementing logic equations to detect the six rule 1 cases for one detect and the six rule 2 cases for zero detect.

Subtractions may result in a negative sum in two's complement format. A negative number in two's complement format has a string of leading ones before the significant bits which are zeros. Thus the first zero is detected for negative sums. Since it is not known if the sum is negative when the leading one prediction occurs, both the leading one and the leading zero are predicted. Both leading-one and leading zero prediction logic receive the G, P, Z terms as inputs from the g,p cells in the first stage of the floating point adder. The second stage of the adder groups three bits together to produce three-bit propagate and generate terms designated PP and GG. Part of the adder's second stage may be combined with the leading one/zero detect for the four-bit groups.

DETAILED GATE-LEVEL IMPLEMENTATION

In the adder the input operands are reduced to g,p signals for each bit position. Every three bit-positions are then combined to form a 3-bit group propagate signal and a 3-bit group generate signal which are used to propagate the carry across all bits of the adder to form the final sum. These three-bit group propagate signals are also shared by the leading one/zero prediction logic. Sharing the propagate signals with the adder and the leading one and zero detection reduces loading on the adder cells and the operand inputs, which ultimately increases speed. The three-bit propagate signal is simply the logical AND of the three individual propagate signals for the group, while the group generate is simply the carry-out for the group assuming the group carry-in is zero. The group generate GG is active when the three bits are G-, PG-, or PPG, where "-" is a don't care.

The four-bit sequences identified above are searched for starting with every thrid bit-position. When any of the sequences are detected, then a leading one or leading zero is not predicted. If none of the zero-blocking sequences shown above are found, then a zero is predicted for that group. If none of the one-blocking sequences shown above are found, then a one is predicted for that group.

Figure 6:
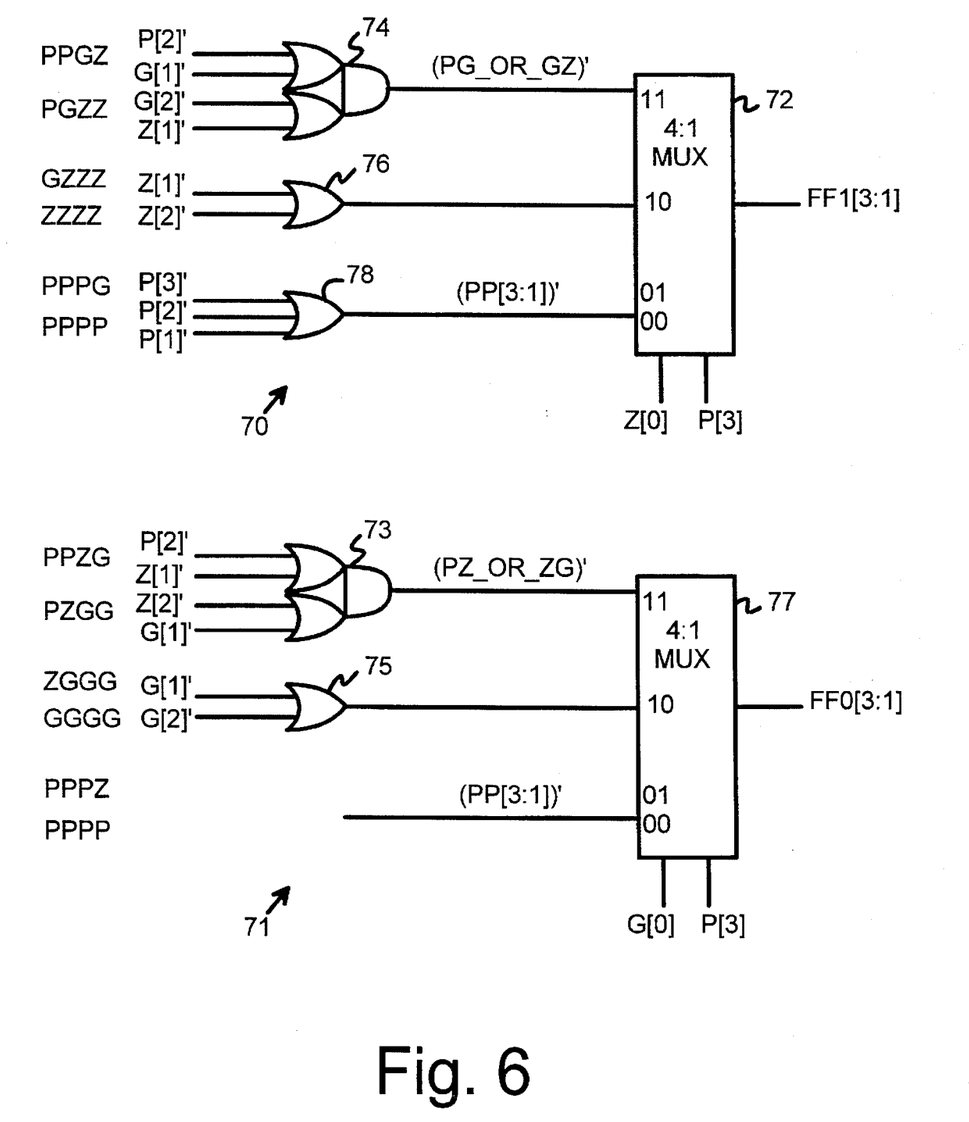
FIG. 6 illustrates the logic which searches for propagate, generate sequences which predict a one and a zero in a group of 3 bit-positions.

FIG. 6 illustrates the logic which searches for propagate, generate sequences which predict a one and a zero in a group of 4 bit-positions. Four-bit group predict logic 70 receives the active-low propagate, generate, and zero signals from four adjacent ECL g,p,z half-adder cells, as shown in FIG. 5. The bracketed numerals designate a cell's position in the four-bit group, with the higher numerals designating more-significant bit-positions. For example, the most-significant bit-position's propagate signal is designated P[3]', while the least-significant bit's active-low generate is designated G[0]'. Logic 70 predicts the presence of a one in the three bit-positions [3], [2], and [1], although the next lower bit-position, [0] is also input to logic 70. Thus adjacent 4-bit groups overlap by one bit.

OR-AND gate 74 outputs an active-low signal when the half-adder cells for the middle bits [2], [1] output P,G or G,Z. When bit [0] outputs a Z and the MSB [3] outputs a P, then the upper 11 input of mux 72 is selected, and found-one output FF1[3:1] is inactive (low) when the four bits are PPGZ or PGZZ. When bit [0] is Z but bit [3] is not P (either Z or G), then the middle 10 input to mux 72 is selected to the output FF1[3:1]. When the middle bits [2], [1] are both Z, then FF1[3:1] is low, indicating that either the sequence GZZZ or ZZZZ was found, and neither sequence predicts a one.

The four-bit group propagate term PP[3:1]' is the AND of the three individual propagate outputs for the three bits [3], [2], [1]. The group propagate is used to propagate the carry when the adder generates the sum. This group propagate is also used for the prediction logic. OR gate 78 generates the active low group propagate PP[3:1]' when all three bits are P. The lower input to mux 72 is selected when the overlapping bit-position [0] is not Z (either G or P). When the upper three bits are all propagate, then the found-one output is inactive-low, as the sequences PPPG and PPPP do not predict a one.

Thus 4-bit group logic 70 searches for the four-bit sequences PPGZ, PGZZ, GZZZ, ZZZZ, PPPG, and PPPP. These are the same sequences described above. If any of these sequences are found, then a one is not predicted and the found-one output FFI[3:1] is inactive (low). Any other sequence asserts the found-one output and predict the presence of a one in the three bits [3], [2], [1] [0].

Four-bit group predict logic 71 predicts the presence of a zero in the three bits [3], [2], [1], in a manner similar to that of logic 70 just described. OR-AND gate 73 detects when the middle bits [2], [1] are PZ or ZG, and the first input 11 on mux 77 drives the found-zero output FF0[3:1] inactive low when the MSB is P and the overlapping bit [0] is G. Thus the sequences PPZG and PZGG are detected. The middle input to mux 77 detects the sequences ZGGG and GGGG using OR gate 75 to detect the middle two bits as G. The group propagate signal from gate 78 is also used for logic 71. Thus logic 71 outputs a found-zero signal for all sequences except PPZG, PZGG, ZGGG, GGGG, PPPZ, and PPPP, the sequences noted above which do not predict a zero.

Figure 7:
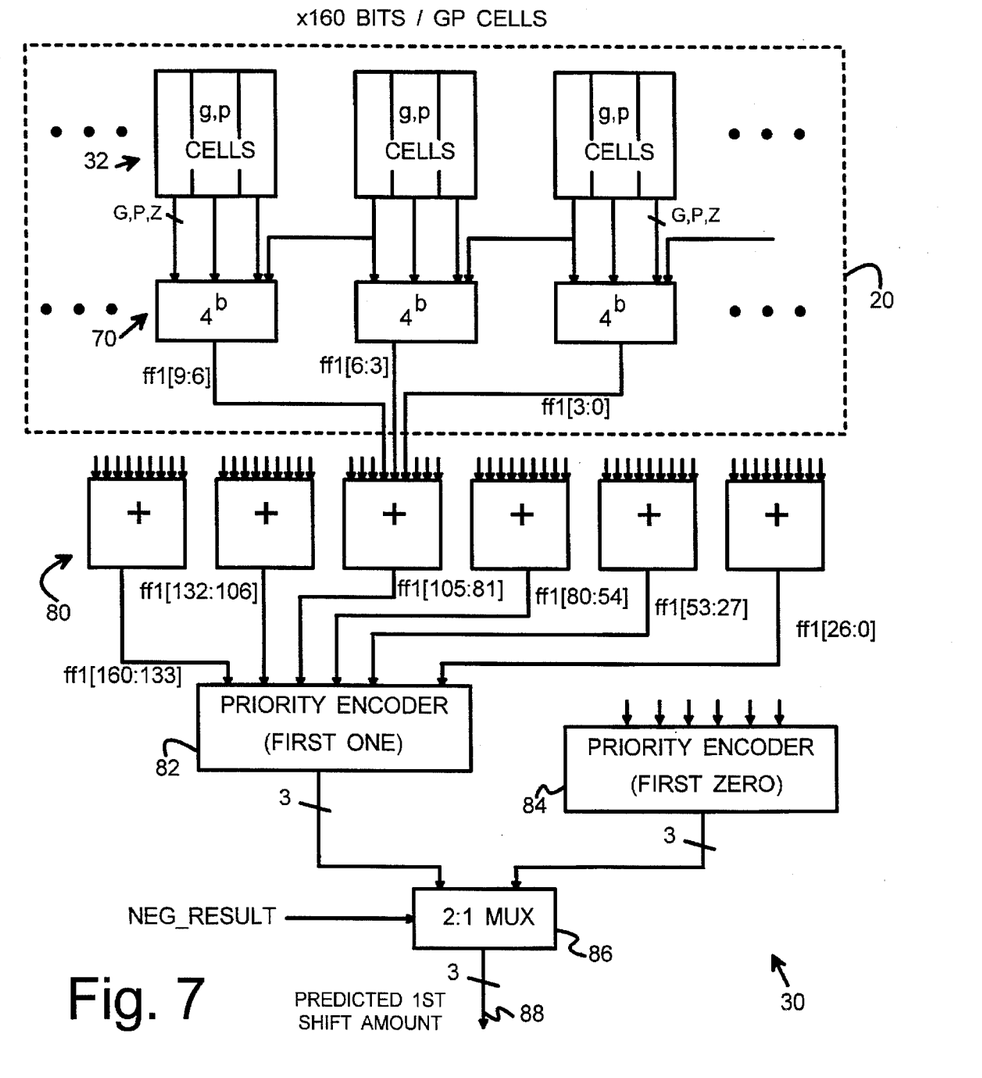
FIG. 7 shows in detail how the generate, propagate, zero signals from the floating point adder are used by the leading-one predictor.

Coarse 27-Bit Prediction and Shifting—FIG. 7

FIG. 7 shows in detail how the generate, propagate, zero signals from the adder 20 are used by the leading-one predictor 30 for a 160-bit add. Half-adder G, P, Z cells 32 produce g,p,z outputs for each bit position in the adder. These g,p,z outputs are input to 4-bit group predict logic 70, as was shown for FIG. 6. Note that four sets of g,p,z signals are received by each 4-bit group, and leading-one detection is for the four-bit group. Each 4-bit group predict logic outputs a find-first-one signal indicating a prediction for a one within the three-bit group.

Nine find-first-one signals (the found-one signal from FIG. 6) from nine 4-bit groups are OR-ed together in wired-OR gates 80. Thus the output from wired-OR gates 80 is a find-first one signal for each (9×3=)27-bit group. Wired-OR gates are easily implemented in ECL and are very fast.

Priority encoder 82 receives the find-first-one signals from each of the 27-bit groups output from wired-OR gates 80. A 3-bit predicted select signal is outputted, encoding the first or left-most 27-bit group containing a predicted one. A second priority encoder 84 generates a second 3-bit predicted select signal encoding the first 27-bit group containing a predicted zero. Second priority encoder 84 receives find-first-zero signals from wired-OR gates and 4-bit group predict logic 71 for predicting a zero within a group, similar to logic 70 and wired-OR 80, but not shown in FIG. 7. Mux 86 selects either the first-one encoding from priority encoder 82 or the first-zero encoding from second priority encoder 84, depending on whether a negative result is outputted from the adder. The leading significant bit of a negative number in two's complement is a zero.

The output from mux 86 is a coarse prediction signal 88 which selects one of the 27-bit groups as the group containing the leading one or leading zero. This coarse prediction signal controls a first shift by coarse shifter 35 of FIG. 3, which performs a coarse shift by a multiple of 27 bits.

Figure 8:
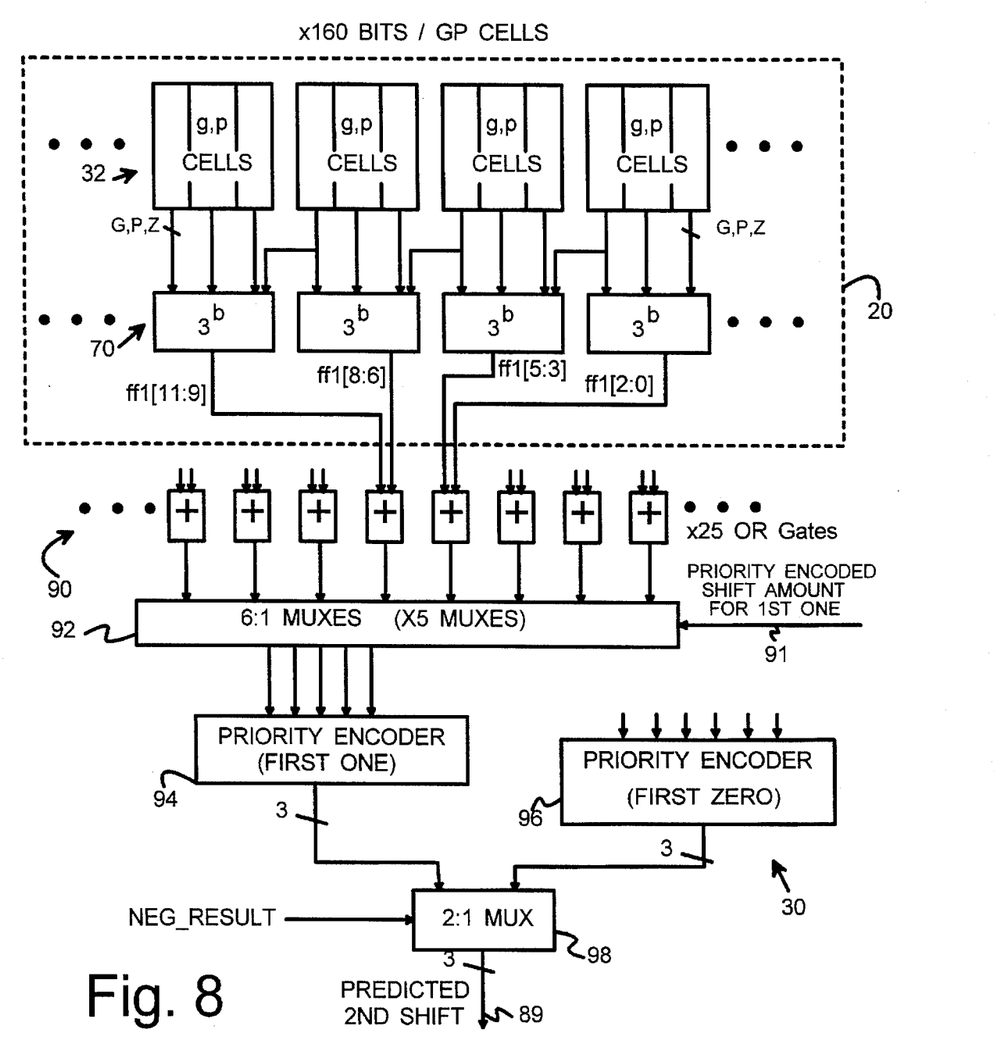
FIG. 8 shows the intermediate 6-bit leading-one prediction and selection.

Intermediate 6-Bit Prediction and Shifting—FIG. 8

FIG. 8 shows the intermediate 6-bit leading-one prediction and selection. The find-first-one signals (the found-one signal from FIG. 6) from 4-bit group predict logic 70 are also sent to 2-input wired OR gates 90, which output a predicted one signal for each 6-bit group. For a 160-bit adder, 25 2-input wired-OR gates 90 are used, producing 25 predicted one signals for each of the 25 6-bit groups. Muxes 92 then select five of the 25 predicted-one signals, the five selected signals being from the 27-bit group that was selected by coarse prediction logic described for FIG. 7. The priority encoded shift amounts 91 from priority encoders 82, 84 of FIG. 7 control muxes 92, selecting the 6-bit groups in the predicted 27-bit group.

The find-first one signals from the selected 6-bit groups outputted from muxes 92 are sent to priority encoder 94. The left-most 6-bit group having an active find-first-one signal is chosen by priority encoder 94, and the position of this 6-bit group with the leading one is encoded and sent to mux 98. Three-bit predict logic groups 71, wired-OR gates 90, and muxes 92 are duplicated for predicting the position of the first zero (not shown). The encoded position of the first zero in the selected 27-bit group is output from second priority encoder 96. Mux 98 then selects, based on the sign of the sum from the adder, either the encoded leading-one position or the encoded leading-zero position as the intermediate prediction signal 89. This intermediate prediction signal 89 controls the shifting of the result by second shifter 36 of FIG. 3.

Final Detection and Shifting

After coarse shifter 35 and second shifter 36 of FIG. 3 have shifted the predicted 27-bit group and then the 6-bit group containing the leading zero or one, this leading one or zero is in the upper 7 bits of the shifted result. Partial leading-one detector 33 detects the exact position of the leading one and final shifter 39 aligns the leading one to the MSB position. Since the sum has been selectively complemented before partial leading-one detector 33, the leading zero no longer has to be detected as the sum is positive.

While it would be simple to have partial leading-one detector 33 directly examine the chosen 6-bit group, this can introduce additional delay since the intermediate shift must occur before detection. Instead, partial leading-one detector 33 examines all 6-bit groups in the predicted 27-bit group, and uses the intermediate prediction signal 89 to select a detection signal from the predicted 6-bit group.

Figure 9:
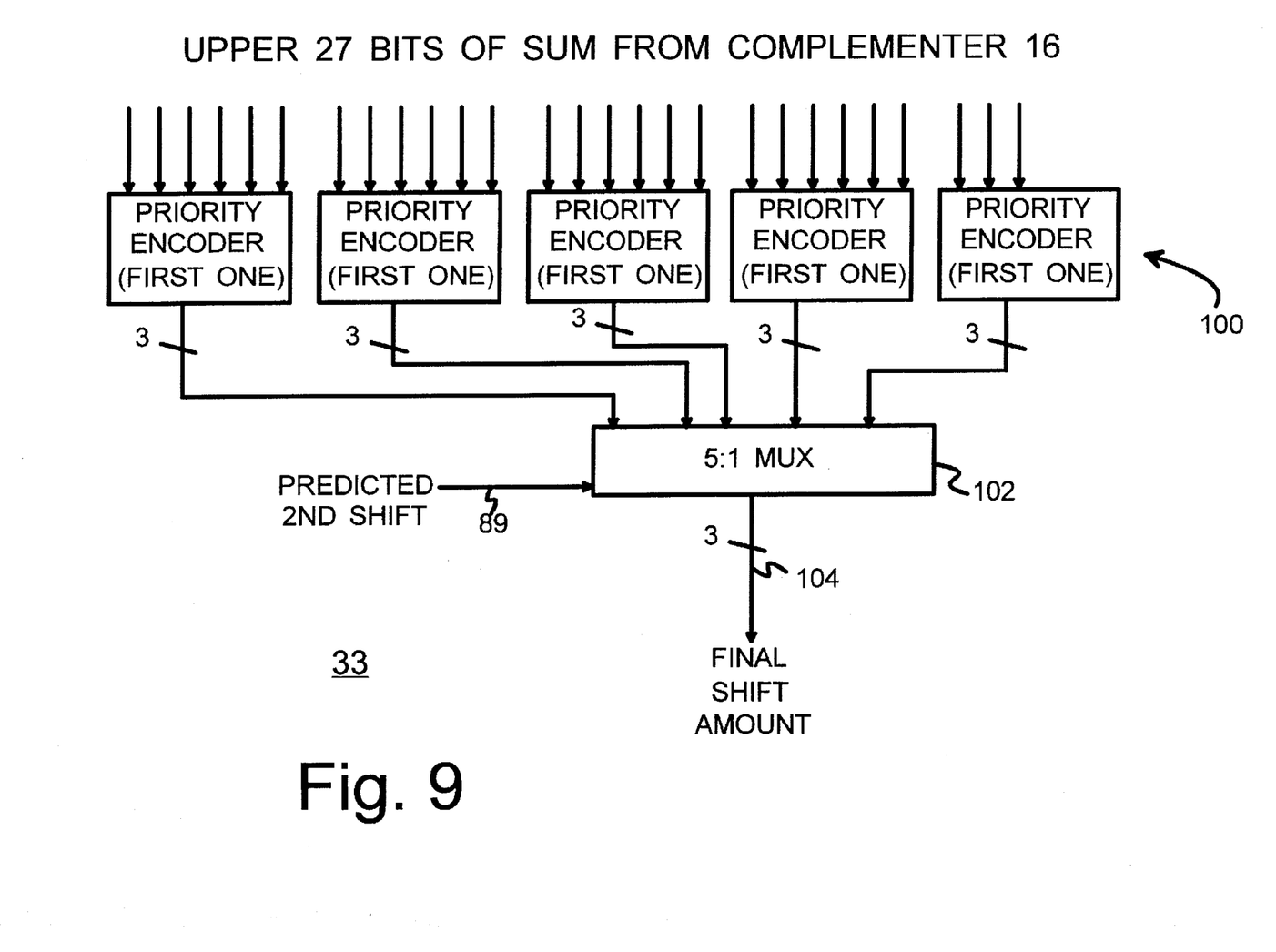
FIG. 9 illustrates an embodiment of the exact leading-one detector.

FIG. 9 illustrates an embodiment of the partial leading-one detector 33. Priority encoders 100 encode the position of the leading one in each 6-bit group for the predicted 27-bit group. Mux 102 receives intermediate prediction signal 89 from leading-one predictor 30 of FIG. 3. Mux 102 outputs the encoded position of the leading one in the predicted 6-bit group. This output is the final shift amount 104, which controls final shifter 39. Thus the final shift is exact, although an intermediate shifted sum is examined.

Binary ones and zeros are represented by electrical signals having relativly high and relativly low voltages, as is well known in the art.

ALTERNATE EMBODIMENTS

Several other embodiments are contemplated by the inventors. For example the invention should not be restricted to the two-port adder described, but could be implemented in larger multi-port adders. Polarities of signals or inputs could be reversed. Active low signals could be employed rather than active high signals. Computation could require several clock cycles or only a fraction of a clock cycle. Many implementations of the logic required for the adder and other functions are possible. The exact number of bits in the adder may vary because of architectural modifications. The number of bits in a prediction group may be varied. Also the levels of prediction can be modified as can the width of the shift at each level.

One preferred modification is to have three ports or inputs to the half-adder cell, such as with a carry-save adder cell. The three inputs still produce one propagate term and one generate term and one zero term. Propagate is still the exclusive-OR of the inputs, now three instead of two. When exactly one or three of the inputs is one, then the propagate (lower-order) output is active. The generate (higher-order) output is active when two or three of the inputs are one while zero is active when all three inputs are zero. The propagate, generate, and zero outputs can then be used by the leading-one/zero predict logic as described.

The g,p,z cell may also be reduced when there is only one input or port. With only one input, the one input is simply buffered or inverted to become the propagate term or zero term. Propagate is active when the single input is one, but zero is active when the single input is zero. Generate is never activated when only one input is present.

While having only one input seems trivial, it has several practical uses. An incrementor has only one input for each bit-position, and a carry-in to the lowest bit-position. Thus the invention may be used to predict the leading one or zero in an incrementor. If the input to the incrementor is 000010010, then the modified p,g,z cells produce the terms ZZZZPZZPZ. This resolves to 000010010 when the carry-in is zero, but to 000010011 when the carry-in is one. The leading one is predicted in the second 3-bit group from the left.

A single two or three-port adder may have a one-port subset of the input bit-positions. For example, a 161-bit three-port adder may add two 106-bit operands to a third operand that is 161-bits wide. The upper 55 bits only receive an input from the third operand. Thus the upper 55 bit-positions are an incrementor while the lower 106 bit-positions are a three-port adder. This type of adder/incrementor is useful for executing multiply-add operations that are common for video decompression using the PowerPC™ instruction set. Two operands are multiplied together in a multiplier array, producing two 106-bit partial products which must be added together to yield the product. Instead of first adding these two partial products together, the third operand may be added to these two partial products in one step using a three-port adder. This third operand is shifted as many as 54 bit-positions relative to the partial products; thus the third operand may have some of its bits shifted up to the upper 54-bit incrementor portion of the adder.

While the final shifter has been described as a discrete 6:1 multiplexer, it may be divided into a 4:1 and a 2:1 mux. The final 2:1 mux may be controlled by a leading-one detector that examines just the upper two bits, while the exact leading-one detector examines three pairs of bits for each 6-bit group, outputting a shift amount of 0 or 4. Technologies other than ECL may also be applied to the invention.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A floating point adder for generating a normalized sum of a plurality of input operands, the floating point adder comprising:

a plurality of half-adder cells, each half-adder cell in the plurality of half-adder cells receiving a bit-position of each operand in the plurality of operands, each half-adder cell outputting a generate signal when at least two of the plurality of operands have a binary one for the bit-position, each half-adder cell outputting a propagate signal when at least one of the plurality of operands have a binary one for the bit-position;

carry-propagate means, receiving the generate and propagate signals from the plurality of half-adder cells, for outputting a sum of the plurality of operands, the carry-propagate means including means for propagating a carry input from adjacent lower-significance bit-positions to adjacent higher-significance bit-positions when the propagate signal is active, but not propagating the carry input when none of the generate and propagate signals input to the carry-propagate means is active;

a leading significant-bit predictor, receiving the generate and propagate signals from the plurality of half-adder cells, for generating a first prediction signal indicating a predicted position of the most-significant bit in the sum;

a first shifter, receiving the sum from the carry-propagate means, for shifting the sum and outputting a shifted sum in response to the first prediction signal so that the most-significant bit in the sum is shifted to a more significant bit-position in the shifted sum;

a leading significant-bit detector, receiving the shifted sum, for determining the bit-position of a leading significant bit and outputting a final shift amount signal; and final shift means, responsive the final shift amount signal, for shifting the shifted sum such that the leading significant bit is shifted to a most significant bit-position in the normalized sum, whereby the leading significant-bit predictor predicts the bit-position of the leading significant bit from the generate and propagate signals.

2. The floating point adder of claim 1 wherein the leading significant-bit predictor comprises:

sequence means for detecting a sequence of the generate and propagate signals for a group of adjacent bit-positions;

output means for outputting a found-one signal for the group of adjacent bit-positions when the sequence is not detected in the group of adjacent bit-positions, the found-one signal indicating that at least one binary one is predicted to be present in the sum for the group of adjacent bit-positions;

prioritizing means, receiving a plurality of found-one signals for a plurality of groups of adjacent bit-positions, for outputting the first prediction signal indicating the predicted position of the most-significant bit in the sum, the predicted position being a position for a most-significant group of adjacent bit-positions with the found-one signal, whereby the leading significant-bit predictor predicts the bit-position of a leading group containing a predicted binary one.

3. The floating point adder of claim 2 wherein the sequence comprises any number of bit-positions with active propagate signals adjacent to a single bit-position with an activated generate signal adjacent to any number of bit-positions with neither the generate signal nor the propagate signal activated, the sequence producing a group of sum bits which are predicted to be absent any binary ones.

4. The floating point adder of claim 3 wherein the group of adjacent bit-positions comprises at least three adjacent bit-positions.

5. The floating point adder of claim 3 wherein the leading significant-bit predictor further comprises:

zero sequence means for detecting a binary-zero-absent sequence of the generate and propagate signals for the group of adjacent bit-positions;

zero output means for outputting a found-zero signal for the group of adjacent bit-positions when the binary-zero-absent sequence is not detected in the group of adjacent bit-positions, the found-zero signal indicating that at least one binary zero is predicted to be present in the sum for the group of adjacent bit-positions;

zero prioritizing means, receiving a plurality of found-zero signals for a plurality of groups of adjacent bit-positions, for outputting the first prediction signal indicating the predicted position of the most-significant bit in the sum, the predicted position being a position for a most-significant group of adjacent bit-positions with the found-zero signal, whereby the leading significant-bit predictor predicts the bit-position of the leading group containing a predicted binary zero.

6. The floating point adder of claim 5 wherein the binary-zero-absent sequence comprises any number of bit-positions with active propagate signals adjacent to a single bit-position with neither the generate signal nor the propagate signal activated adjacent to any number of bit-positions with an activated generate signal, the binary-zero-absent sequence producing a group of sum bits which are predicted to be absent any binary zeros.

7. The floating point adder of claim 6 further comprising:

a sign for the sum from the floating point adder, the sign indicating when the sum from the floating point adder represents a negative binary number or a positive binary number; and multiplexer means, responsive to a sign for the sum from the floating point adder, for outputting the first prediction signal from the prioritizing means when the sign indicates that the sum is positive, but for outputting the first prediction signal from the zero prioritizing means when the sign indicates that the sum is negative.

8. The floating point adder of claim 1 wherein the carry-propagate means comprises a plurality of carry-propagate cells, each carry-propagate cell receives the generate and propagate signals from a first group of the plurality of half-adder cells, each carry-propagate cell generating a group propagate signal and a group generate signal.

9. The floating point adder of claim 8 wherein the leading significant-bit predictor further receives the group propagate signals and the group generate signals from the carry-propagate cells.

10. The floating point adder of claim 9 wherein the first group comprises at least three half-adder cells.

11. The floating point adder of claim 10 wherein the half-adder cells each comprise a single Emitter-coupled logic (ECL) gate outputting an active-low generate signal and an active-low propagate signal.

12. The floating point adder of claim 11 wherein the half-adder cell further outputs an active-low zero signal when neither the propagate signal nor the generate signal are active.

13. A floating point unit for generating a normalized sum of a plurality of input operands, the floating point unit comprising:

a plurality of half-adder cells, each half-adder cell in the plurality of half-adder cells receiving a bit-position of each operand in the plurality of operands, each half-adder cell outputting a generate signal when at least two of the plurality of operands have a binary one for the bit-position, each half-adder cell outputting a propagate signal when an odd number of the plurality of operands have a binary one for the bit-position;

group-propagate cells, receiving the generate and propagate signals from the plurality of half-adder cells, for outputting group propagate and group generate signals;

propagate means for propagating the group propagate and the group generate signals from the group-propagate cells, the propagate means outputting a sum of the plurality of operands;

a leading significant-bit predictor, receiving the generate and propagate signals from the plurality of half-adder cells, for generating a first prediction signal indicating the predicted position of a leading group of bit-positions containing the most-significant bit in the sum, the leading significant-bit predictor also outputting a second prediction signal indicating a relative position within the leading group of the most-significant bit in the sum;

a first shifter, receiving the sum from the propagate means, for shifting the sum and outputting a shifted sum in response to the first prediction signal so that the most-significant bit in the sum is shifted to a more significant bit-position in the shifted sum;

a complementor, receiving the shifted sum, for selectively complementing the shifted sum when the shifted sum represents a negative number, the complementor outputting a selectively complemented sum;

a second shifter, receiving the selectively complemented sum from the complementor, for shifting the selectively complemented sum and outputting a twice shifted sum in response to the second prediction signal so that the most-significant bit in the selectively complemented sum is shifted to a more significant bit-position in the twice shifted sum;

a leading significant-bit detector, receiving the selectively complemented sum and the second prediction signal, for determining the bit-position of a leading significant bit in the twice shifted sum and outputting a final shift amount signal; and final shift means, responsive the final shift amount signal, for shifting the twice shifted sum such that the leading significant bit is shifted to the most significant bit-position in the normalized sum, whereby the leading significant-bit predictor predicts the bit-position of the leading significant bit from the generate and propagate signals.

14. A computer-implemented method for normalizing a sum from an adder, the method comprising the computer-implemented steps of:

applying electrical signals representing the value of a first operand and the value of a second operand to inputs to the adder;

generating propagate and generate signals for a plurality of bit-positions in the adder, a generate signal for a bit-position being activated when an electrical signals representing the first operand and the second operand are both activated for the bit-position, a propagate signal for the bit-position being activated when exactly one but not both of the electrical signals representing the first operand and the second operand are activated for the bit-position;

applying the propagate and generate signals to a leading-significant-bit predictor;

generating a predicted shift amount based on the propagate and generate signals applied to the leading-significant-bit predictor, the predicted shift amount being approximately a number of leading bit-positions not having a significant bit;

outputting a sum from the adder by propagating carries between bit-positions, a carry being generated by the generate signals, the carry being propagated by the propagate signal, the carry not propagated to another bit-position when the bit position has neither the propagate nor the generate signal activated;

shifting the sum from the adder by a number of bit-positions equal to the predicted shift amount and outputting a shifted sum;

detecting a leading significant bit-position in the shifted sum and outputting a final shift amount; and shifting the shifted sum by the final shift amount to produce a final sum having a leading significant bit in a most-significant bit-position in the final sum, whereby the sum is first shifted by the predicted shift amount that is generated from the propagate and generate signals from the adder.

15. The method of claim 14 wherein the significant bit is a one when the sum represents a positive number, but the significant bit is a zero when the sum represents a negative number.

16. The method of claim 15 wherein the step of generating propagate and generate signals further includes the step of generating a zero signal for a bit-position when both the generate and the propagate signals are not activated for the bit-position.

17. The method of claim 15 wherein the step of generating propagate and generate signals comprises applying the electrical signals representing the first operandand the second operand to a plurality of half-adder cells.

18. The method of claim 17 wherein the step of generating the predicted shift amount based on the propagate and generate signals applied to the leading-significant-bit predictor comprises:

inputting generate and propagate signals for a group of adjacent bit-positions;

searching for a sequence of propagate signals in more-significant bit-positions followed by a generate signal for a single bit-position, followed by neither generate signals nor propagate signals for less-significant bit-positions;

outputting a first signal indicating that the group does not contain a leading significant bit when the sequence or a portion of the sequence is found in the group;

prioritizing the first signal from the group of adjacent bit-positions and first signals from other groups of bit-positions, and encoding the position of a most-significant group having an inactive first signal;

generating the predicted shift amount from an encoded position of the most-significant group having an inactive first signal;

whereby the predicted shift amount is approximately the number of leading bit-positions not having a significant bit.

19. The method of claim 18 wherein the group of adjacent bit-positions comprise at least three adjacent bit-positions.

* * * * *